United States Patent
Guan et al.

(10) Patent No.: US 11,755,207 B2
(45) Date of Patent: Sep. 12, 2023

(54) DATA STORAGE METHOD IN STORAGE SYSTEM AND RELATED DEVICE

(71) Applicant: HUAWEI TECHNOLOGIES CO., LTD., Shenzhen (CN)

(72) Inventors: Kun Guan, Saint Petersburg (RU); Bang Liu, Saint Petersburg (RU); Liyu Wang, Xi'an (CN); Shaohui Quan, Hangzhou (CN); Liangxiang Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/840,982

(22) Filed: Jun. 15, 2022

(65) Prior Publication Data
US 2022/0308765 A1 Sep. 29, 2022

Related U.S. Application Data

(63) Continuation of application No. PCT/CN2020/133542, filed on Dec. 3, 2020.

(30) Foreign Application Priority Data

Dec. 18, 2019 (CN) .......................... 201911312004.2

(51) Int. Cl.
 *G06F 12/00* (2006.01)
 *G06F 3/06* (2006.01)
(52) U.S. Cl.
 CPC .......... *G06F 3/0613* (2013.01); *G06F 3/0608* (2013.01); *G06F 3/0641* (2013.01); *G06F 3/0683* (2013.01)
(58) Field of Classification Search
 CPC .... G06F 3/0613; G06F 3/0608; G06F 3/0641; G06F 3/0683
 See application file for complete search history.

(56) References Cited

U.S. PATENT DOCUMENTS 9,262,434 B1 2/2016 Shilane et al.
2015/0010143 A1* 1/2015 Yang ...................... G06F 3/068
 380/28

(Continued)

FOREIGN PATENT DOCUMENTS

CN 103959259 A 7/2014
CN 107544863 A 1/2018

(Continued)

OTHER PUBLICATIONS

Zhang et al.,"Reducing Solid-State Storage Device Write Stress through Opportunistic In-place Delta Compression", 14th USENIX Conference on File and Storage Technologies (FAST16), Feb. 22-25, 2016, pp. 111-124.

*Primary Examiner* — Shawn X Gu
(74) *Attorney, Agent, or Firm* — Maier & Maier, PLLC

(57) ABSTRACT

A data storage method in a storage system and a related system. The method includes: calculating a similar fingerprint of first to-be-stored data to obtain a first similar fingerprint, where the first similar fingerprint is for determining whether the first to-be-stored data is similar to stored data; determining reference data based on the first similar fingerprint, where a similar fingerprint of the reference data is the first similar fingerprint; determining first differential data between the to-be-stored data and the reference data based on the reference data, where the reference data is stored in a first storage unit; and storing the first differential data in a second storage unit, where the first storage unit and the second storage unit belong to a read range of a same read I/O.

14 Claims, 9 Drawing Sheets

(56) References Cited

U.S. PATENT DOCUMENTS

2017/0038978 A1  2/2017  Li et al.
2018/0253254 A1  9/2018  Jain et al.

FOREIGN PATENT DOCUMENTS

CN    108134775 A    6/2018
CN    108984123 A    12/2018

* cited by examiner

DATA STORAGE METHOD IN STORAGE SYSTEM AND RELATED DEVICE

CROSS-REFERENCE TO RELATED APPLICATIONS

This application is a continuation of International Application No. PCT/CN2020/133542, filed on Dec. 3, 2020, which claims priority to Chinese Patent Application No. 201911312004.2, filed on Dec. 18, 2019. The disclosures of the aforementioned applications are hereby incorporated by reference in their entireties.

TECHNICAL FIELD

The embodiments relate to the field of data storage technologies, a data storage method in a storage system, and a related device.

BACKGROUND

With continuous improvement of informatization and rapid development of big data, cloud computing, and artificial intelligence technologies, an enterprise's demand for data increases explosively. Such a large amount of data surely brings great pressure to data storage management. How to improve storage space utilization and meet the rapidly increasing storage demand with a limited storage capacity is a primary problem faced by many storage server vendors. Therefore, a data reduction technology becomes an indispensable key technology in a storage system, and a reduction ratio is used as an important indicator for measuring storage system performance. Currently, the data reduction technology includes three implementation methods: compression, deduplication, and similar data deletion (Delta compression/similar compression). Data compression can only reduce a data capacity, and deduplication can only reduce same data. A large amount of similar data still occupies large storage space. Therefore, similar data deletion can greatly reduce the data capacity.

In an existing solution, reference data and differential data of data are stored in a discrete and distributed manner during similar data deletion. When data needs to be read, input/output (I/O) needs to be read twice to read the differential data and the reference data from a disk respectively, to restore the data. In this way, read amplification is caused. In addition, separate storage makes an index structure and a search process more complex. Therefore, storage system performance and an overall reduction ratio are affected.

Based on the foregoing description, how to implement efficient data storage and avoid read amplification while impact on the storage system performance is reduced is a problem that needs to be resolved by a person skilled in the art.

SUMMARY

Embodiments include a data storage method in a storage system and a related device, to implement efficient data storage and avoid read amplification while impact on storage system performance is reduced.

According to a first aspect, an embodiment includes a data storage method in a storage system, where the method includes:

calculating a similar fingerprint of first to-be-stored data to obtain a first similar fingerprint, where the first similar fingerprint is for determining whether the first to-be-stored data is similar to stored data;

determining reference data based on the first similar fingerprint, where a similar fingerprint of the reference data is the first similar fingerprint;

determining first differential data between the to-be-stored data and the reference data based on the reference data, where the reference data is stored in a first storage unit; and storing the first differential data in a second storage unit, where the first storage unit and the second storage unit belong to a read range of a same read I/O.

In this embodiment, the reference data and differential data are stored in a same preset storage space, and data stored in the preset storage space can be read by one read I/O, avoiding a problem of read amplification and improving read performance of a storage system.

In a possible implementation, the method further includes:

calculating a deduplication fingerprint of the first to-be-stored data to obtain a first deduplication fingerprint; and comparing the first deduplication fingerprint with a deduplication fingerprint associated with the first similar fingerprint, to determine that the first deduplication fingerprint is different from the associated deduplication fingerprint, where a similar fingerprint of data represented by the associated deduplication fingerprint is the first similar fingerprint.

In this embodiment, a similar relationship, a same relationship, or a different relationship between to-be-stored data and stored data is quickly determined with reference to a similar fingerprint and a deduplication fingerprint that are of the data, to implement efficient data storage.

In a possible implementation, the method further includes adding the first deduplication fingerprint as a deduplication fingerprint associated with the first similar fingerprint.

In a possible implementation, the method further includes:

calculating a similar fingerprint of second to-be-stored data to obtain the first similar fingerprint;

calculating a deduplication fingerprint of the second to-be-stored data to obtain the first deduplication fingerprint;

comparing the first deduplication fingerprint of the second to-be-stored data with the deduplication fingerprints associated with the first similar fingerprint, to determine that the deduplication fingerprints associated with the first similar fingerprint include the first deduplication fingerprint; and increasing a quantity of reference times of the first deduplication fingerprint by one.

In this embodiment, data that has a same deduplication fingerprint is same data, that is, duplicate data. Therefore, to save storage space and improve storage space utilization, in a plurality of pieces of duplicate data, only one piece needs to be stored. In addition, a deduplication count may be for recording an original quantity of pieces of the duplicate data so that a quantity of times that the data may be referenced is known.

In a possible implementation, a third storage unit of the storage system stores second differential data. The second differential data is differential data between second data and the reference data; a similar fingerprint of the second data is the first similar fingerprint; and the first storage unit, the second storage unit, and the third storage unit belong to a read range of a same read I/O.

In this embodiment, a plurality of pieces of differential data are stored in a preset storage space that can be read by one read I/O, and reference data of the plurality of differential data is stored in the preset storage space, to ensure that the reference data and the required differential data can be obtained by reading I/O once.

In a possible implementation, a quantity of reference times of a deduplication fingerprint of the reference data is greater than 1, and the deduplication fingerprints associated with the first similar fingerprint include the deduplication fingerprint of the reference data.

In this embodiment, the reference data is deduplication data. In other words, the deduplication data and the differential data coexist in the preset storage space. In this way, storage space may be further saved, and storage space utilization is improved.

In a possible implementation, the first storage unit and the second storage unit belong to storage space preset by the storage system, a plurality of storage units in the preset storage space are successively arranged, and the first storage unit is a storage unit in the preset storage space other than a storage unit at an initial location and a storage unit at an end location.

It can be understood from the foregoing description that the first storage unit is configured to store the reference data. In this embodiment, the reference data is stored between the differential data, so that data reading time may be reduced, and reading efficiency may be improved.

In a possible implementation, the reference data is data stored in the first storage unit after being compressed.

In this embodiment, data is stored after being compressed, so that storage space may be further saved.

According to a second aspect, an embodiment provides a data storage device, where the data storage device includes:

a calculation unit, configured to calculate a similar fingerprint of first to-be-stored data to obtain a first similar fingerprint, where the first similar fingerprint is for determining whether the first to-be-stored data is similar to stored data;

a determining unit, configured to determine reference data based on the first similar fingerprint, where a similar fingerprint of the reference data is the first similar fingerprint, and the determining unit is further configured to determine first differential data between the to-be-stored data and the reference data based on the reference data, where the reference data is stored in a first storage unit; and a storage unit, configured to store the first differential data in a second storage unit, where the first storage unit and the second storage unit belong to a read range of a same read I/O.

In a possible implementation, the calculation unit is further configured to calculate a deduplication fingerprint of the first to-be-stored data to obtain a first deduplication fingerprint.

The device further includes a comparison unit, and the comparison unit is configured to compare the first deduplication fingerprint with a deduplication fingerprint associated with the first similar fingerprint, to determine that the first deduplication fingerprint is different from the associated deduplication fingerprint, where a similar fingerprint of data represented by the associated deduplication fingerprint is the first similar fingerprint.

In a possible implementation, the device further includes an adding unit, and the adding unit is configured to add the first deduplication fingerprint as a deduplication fingerprint associated with the first similar fingerprint.

In a possible implementation, the calculation unit is further configured to calculate a similar fingerprint of second to-be-stored data to obtain the first similar fingerprint, and configured to calculate a deduplication fingerprint of the second to-be-stored data to obtain the first deduplication fingerprint.

The comparison unit is further configured to compare the first deduplication fingerprint of the second to-be-stored data with the deduplication fingerprints associated with the first similar fingerprint, to determine that the deduplication fingerprints associated with the first similar fingerprint include the first deduplication fingerprint.

The device further includes an increasing unit, and the increasing unit is configured to increase a quantity of reference times of the first deduplication fingerprint by one.

In a possible implementation, a third storage unit of the storage system stores second differential data. The second differential data is differential data between second data and the reference data; a similar fingerprint of the second data is the first similar fingerprint; and the first storage unit, the second storage unit, and the third storage unit belong to a read range of a same read I/O.

In a possible implementation, a quantity of reference times of a deduplication fingerprint of the reference data is greater than 1, and the deduplication fingerprints associated with the first similar fingerprint include the deduplication fingerprint of the reference data.

In a possible implementation, the first storage unit and the second storage unit belong to storage space preset by the storage system, a plurality of storage units in the preset storage space are successively arranged, and the first storage unit is a storage unit in the preset storage space other than a storage unit at an initial location and a storage unit at an end location.

In a possible implementation, the reference data is data stored in the first storage unit after being compressed.

For beneficial effects of the solution in the second aspect, correspondingly refer to the descriptions in the first aspect. Details are not described herein again.

According to a third aspect, an embodiment provides a data storage device, where the data storage device includes a processor and an interface, the interface is coupled to the processor, and the processor is configured to perform:

calculating a similar fingerprint of first to-be-stored data to obtain a first similar fingerprint, where the first similar fingerprint is for determining whether the first to-be-stored data is similar to stored data;

determining reference data based on the first similar fingerprint, where a similar fingerprint of the reference data is the first similar fingerprint;

determining first differential data between the to-be-stored data and the reference data based on the reference data, where the reference data is stored in a first storage unit; and storing the first differential data in a second storage unit, where the first storage unit and the second storage unit belong to a read range of a same read I/O.

In a possible implementation, the processor is further configured to:

calculate a deduplication fingerprint of the first to-be-stored data to obtain a first deduplication fingerprint; and compare the first deduplication fingerprint with a deduplication fingerprint associated with the first similar fingerprint, to determine that the first deduplication fingerprint is different from the associated deduplication fingerprint, where a similar fingerprint of data represented by the associated deduplication fingerprint is the first similar fingerprint.

In a possible implementation, the processor is further configured to add the first deduplication fingerprint as a deduplication fingerprint associated with the first similar fingerprint.

In a possible implementation, the processor is further configured to:

calculate a similar fingerprint of second to-be-stored data to obtain the first similar fingerprint;

calculate a deduplication fingerprint of the second to-be-stored data to obtain the first deduplication fingerprint;

compare the first deduplication fingerprint of the second to-be-stored data with the deduplication fingerprints associated with the first similar fingerprint, to determine that the deduplication fingerprints associated with the first similar fingerprint include the first deduplication fingerprint; and increase a quantity of reference times of the first deduplication fingerprint by one.

In a possible implementation, a third storage unit of the storage system stores second differential data. The second differential data is differential data between second data and the reference data; a similar fingerprint of the second data is the first similar fingerprint; and the first storage unit, the second storage unit, and the third storage unit belong to a read range of a same read I/O.

In a possible implementation, a quantity of reference times of a deduplication fingerprint of the reference data is greater than 1, and the deduplication fingerprints associated with the first similar fingerprint include the deduplication fingerprint of the reference data.

In a possible implementation, the first storage unit and the second storage unit belong to storage space preset by the storage system, a plurality of storage units in the preset storage space are successively arranged, and the first storage unit is a storage unit in the preset storage space other than a storage unit at an initial location and a storage unit at an end location.

In a possible implementation, the reference data is data stored in the first storage unit after being compressed.

In a possible implementation, deduplication counts of all pieces of data stored in the preset storage space are greater than 1.

For beneficial effects of the solution in the third aspect, correspondingly refer to the descriptions in the first aspect. Details are not described herein again.

According to a fourth aspect, an embodiment provides a computer-readable storage medium. The computer-readable storage medium stores a computer program, and the computer program is executed by the processor to implement the method according to any implementation of the first aspect.

According to a fifth aspect, an embodiment includes a computer-readable storage medium. When a computer program in the computer-readable storage medium is executed on a computer, the computer is enabled to implement the method according to any implementation of the first aspect.

According to a sixth aspect, an embodiment provides a computer program product. When a computer program in the computer program product is read and executed by a computer, the method according to any implementation of the first aspect is performed.

In conclusion, in the embodiments, a similar relationship, a same relationship, or a different relationship between to-be-stored data and stored data is quickly determined with reference to a similar fingerprint and a deduplication fingerprint that are of the data, to implement efficient data storage. In addition, in the embodiments, reference data and differential data are stored in a same preset storage space, and data stored in the preset storage space can be read by one read I/O, avoiding read amplification and improving read performance of a storage system.

DETAILED DESCRIPTION OF THE EMBODIMENTS

First, a storage system applicable to the embodiments is described.

Figure 1:
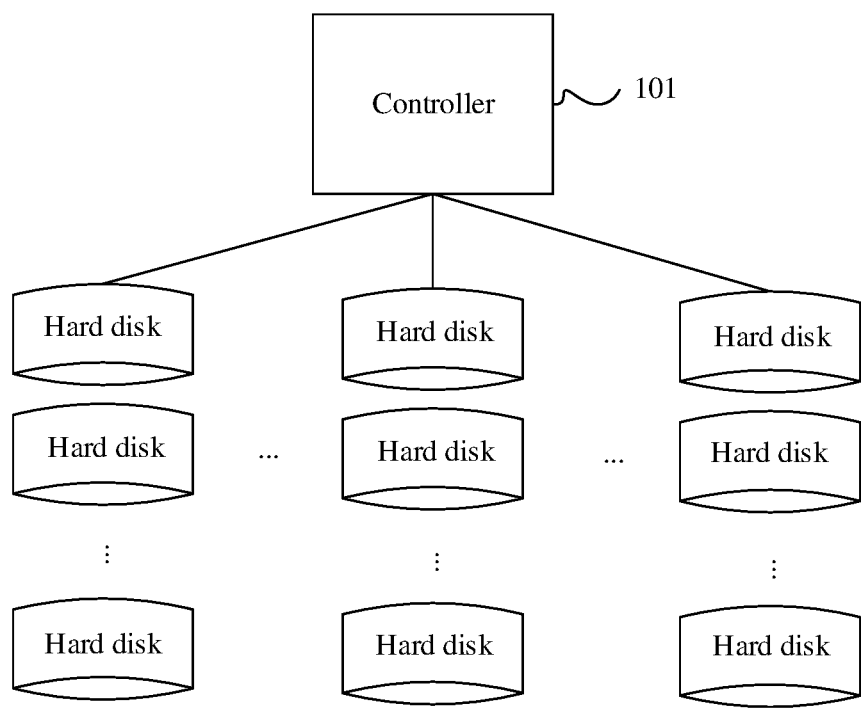
FIG. 1 is a schematic diagram of a structure of a storage system according to an embodiment.
Figure 2:
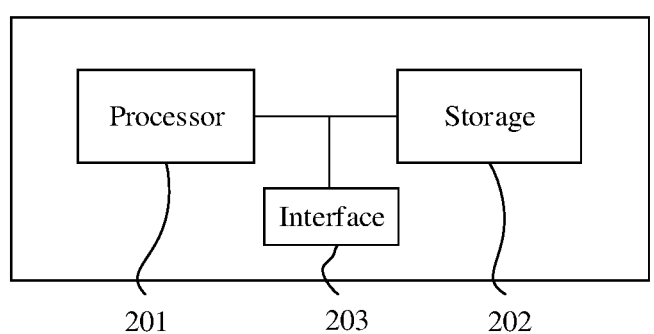
FIG. 2 is a schematic diagram of a structure of a controller included in a storage system according to an embodiment.

As shown in FIG. 1, the storage system in the embodiments may be a storage array (for example, the Oceanstor® 18000 series of Huawei® and the Oceanstor® Dorado® series of Huawei®). The storage array includes a storage controller 101 and a plurality of hard disks. The hard disks include a solid state disk (SSD), a disk, or the like. As shown in FIG. 2, the storage controller 101 includes a processor 201, a storage 202, and an interface 203. The storage 202 stores a computer program, and the processor 201 executes the computer program that is in the storage 202 to perform management and data access operations on the storage system. In addition, the processor 201 may be a central processing unit (CPU) or may be a field programmable gate array (FPGA), or other hardware may be used as the processor. Alternatively, an FPGA or other hardware, and a CPU jointly serve as the processor. The processor communicates with the interface 203. The storage 202 in the embodiments may provide memory for the CPU. The interface 203 may be a network interface card (NIC), a host bus adapter (HBA), or the like.

In the storage array described in FIG. 1 and FIG. 2, the controller 101 is configured to perform a data storage method in the embodiments.

Figure 3:
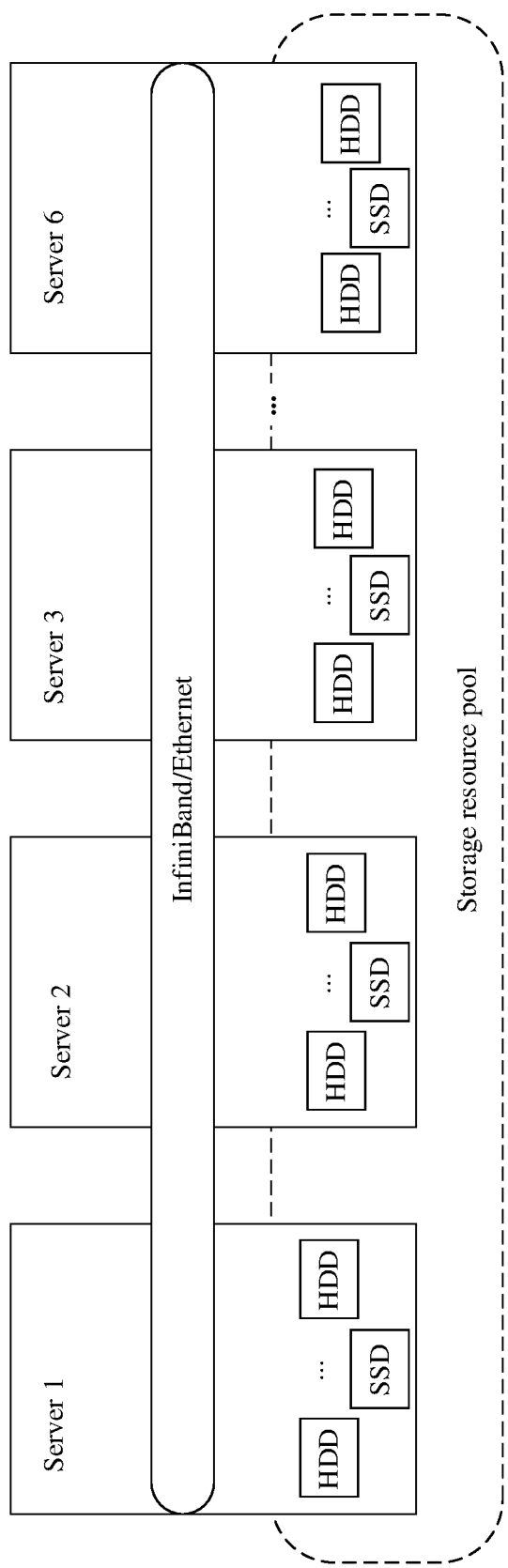
FIG. 3 is a schematic diagram of a structure of a distributed storage system according to an embodiment.

Further, the storage system in the embodiments may alternatively be a distributed storage system (for example, the Fusionstorage® series of Huawei®) or the like. Take the Fusionstorage® series of Huawei® as an example. For example, as shown in FIG. 3, the distributed storage system includes a plurality of servers, such as a server 1, a server 2, a server 3, . . . , and a server 6. The servers communicate with each other by using InfiniBand or an Ethernet network. In actual application, a quantity of servers in the distributed storage system may be increased or decreased based on an actual requirement. This is not limited in the embodiments. A server in the distributed storage system is also referred to as a storage node.

Figure 4:
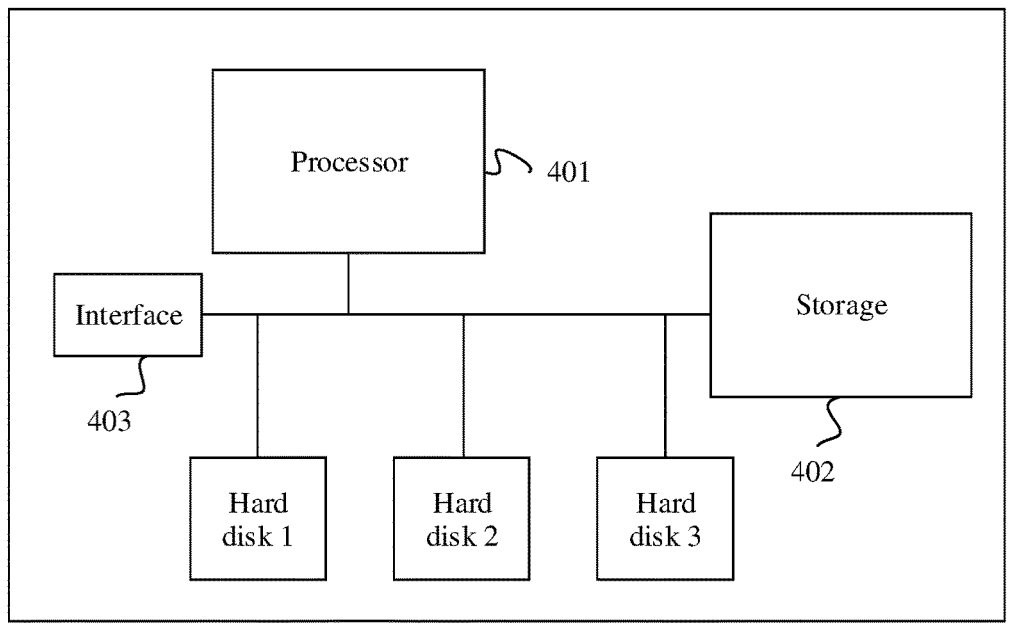
FIG. 4 is a schematic diagram of a structure of a server of a distributed storage system according to an embodiment.

The server in the distributed storage system includes a structure shown in FIG. 4. As shown in FIG. 4, each server in the distributed storage system includes a processor 401, a storage 402, an interface 403, a hard disk 1, a hard disk 2, and a hard disk 3. The storage 402 stores a computer program, and the processor 401 executes the computer program in the storage 402 to perform a corresponding operation. The interface 403 may be a hardware interface, such as a network interface card (NIC) or a host bus adapter (HBA) or may be a program interface module. The hard disks include a solid state disk (SSD), a disk, or the like. In addition, the processor 401 may be a central processing unit (CPU), a field programmable gate array (FPGA), or other hardware may be used as the processor. Alternatively, an FPGA (or other hardware) and a CPU jointly serve as the processor. The storage 402 in the embodiments may provide memory for the processor 401. The interface 303 may be a network interface card (NIC) or a host bus adapter (HBA).

Based on the foregoing description, the following describes the solutions in the embodiments with reference to the accompanying drawings.

As shown in FIGS. 5-9, the five figures are schematic diagrams of a partial storage structure of a data storage structure according to the solutions. It may be understood that the five figures each show a schematic diagram of a data storage structure of a preset storage space.

In an embodiment, the preset storage space may be a chunk of granularity in a storage system. Generally, the chunk of granularity is a basic granularity of a read I/O in the storage system, that is, a data length that may be read by one read I/O. A capacity of the preset storage space may be determined based on an actual situation. This is not limited in this solution. For example, the capacity of the preset storage space may be 8 KB, 16 KB, or the like.

The preset storage space includes a plurality of storage units, and the plurality of storage units may be obtained by evenly dividing, based on the capacity, the preset storage space into a plurality of storage spaces that have equal capacities. Alternatively, the plurality of storage units may be obtained by dividing, based on an actual requirement, the preset storage space into a plurality of storage spaces that have different capacities. A division manner is determined based on a situation. This is not limited in this solution. In an implementation, one read I/O may read all data in the preset storage space or read data in one or more storage units in the preset storage space.

It may be further seen from the foregoing five figures that a storage unit of a data header and a storage unit of a data tail are included in the preset storage space. This indicates that when storing data in the preset storage space, the storage system may first store data in the storage unit of the data header, and then gradually store other data in other storage units according to a preset storage rule until the data tail. In this way, data storage in the preset storage space is completed.

FIG. 5, FIG. 6, FIG. 7, FIG. 8, and FIG. 9 show only a part of the data storage structure provided in the embodiments. The data storage structure provided in the embodiments may include a plurality of the foregoing preset storage spaces. Capacities of all of the plurality of preset storage spaces that are included in the data storage structure provided in the embodiments may be the same or may be different. A capacity of each preset storage space may be set based on an actual requirement. A total data storage capacity of the data storage structure provided in the embodiments is determined based on an actual situation. This is not limited in this solution.

Figure 5:
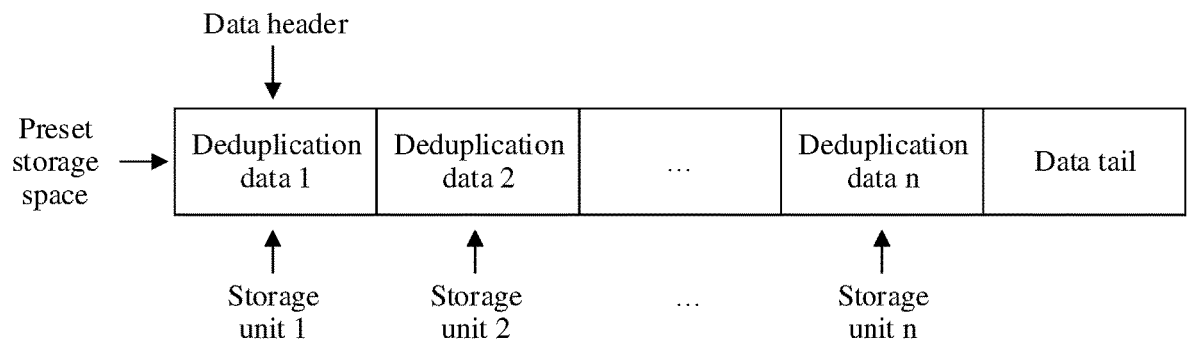
FIG. 5 to FIG. 8 are schematic diagrams of data storage structures according to embodiments.

FIG. 5 is a schematic diagram of a partial data storage structure of pure deduplication data according to a solution. It can be understood from FIG. 5 that, in a plurality of storage units included in one preset storage space, each storage unit may be configured to store one piece of deduplication data; or if a capacity of one piece of deduplication data is large, a plurality of storage units may be applied for storage. It should be noted that the deduplication data described in this embodiment refers to a plurality of pieces of same data in the storage system. To save storage space and improve storage space utilization, only one piece of the plurality of pieces of same data is stored. Therefore, the stored piece of data is referred to as deduplication data. A deduplication operation may be inline deduplication or post-process deduplication.

In FIG. 5, when storing data in the preset storage space, the storage system first stores data in the storage unit of the data header, and then gradually stores other deduplication data in other storage units according to a preset storage rule until the data tail. In this way, data storage in the preset storage space is completed.

Optionally, the preset storage rule may be that deduplication data is stored in the storage units in FIG. 5 one by one according to a sequence of numbers 1, 2, 3, . . . , and n of the storage units. Alternatively, storage may be performed according to another storage rule, and a corresponding storage rule may be determined based on a situation. This is not limited in this solution.

Figure 6:
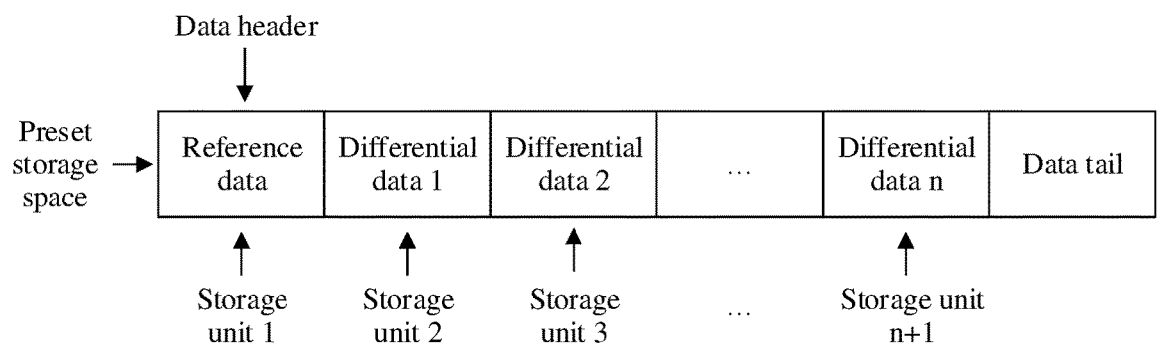

FIG. 6 is a schematic diagram of a partial data storage structure of pure similar data according to a solution. Similarly, the data storage structure includes a plurality of storage units in one preset storage space, and the plurality of storage units include a storage unit of a data header and a storage unit of a data tail. The storage unit of the data header may be configured to store reference data, and storage units other than the data tail may be configured to store differential data. Optionally, one storage unit may be configured to store one piece of differential data; or if a capacity of one piece of differential data is large, a plurality of storage units may be applied for storage.

It should be noted that similar data in this embodiment refers to a plurality of pieces of data that have some same data but are not completely the same. In other words, each piece of data in the plurality of pieces of data may be referred to as similar data of another piece of data in the plurality of pieces of data.

The reference data is relative to the differential data, and the differential data is also relative to the reference data. For example, it is assumed that there are n+1 pieces of data, the n+1 pieces of data are respectively referred to as data 1, data 2, . . . , data n, and data n+1, the n+1 pieces of data are similar data, and the n+1 pieces of data each include the data 1. In this way, the data 1 may be used as the reference data, pieces of data that are in the data 2, the data 3, . . . , and the data n+1 and that are respectively different from the data 1 are differential data, and the pieces of data may be respectively referred to as differential data 1, differential data 2, . . . , and differential data n, where n is an integer greater than or equal to 1.

When the n+1 pieces of data need to be stored, the data 1 may be stored only once. The data 1 is used as the reference data and stored in the storage unit of the data header of the preset storage space. Next, the data 2, the data 3, . . . , and the data n+1 may not need to be completely stored, and only differential data between these pieces of data and the data 1 needs to be stored. In other words, the differential data 1, the differential data 2, . . . , and the differential data n are respectively stored in other storage units of the preset storage space. In this way, data that needs to be stored is reduced, and storage space utilization is improved. In this embodiment, the storage system calculates similar fingerprints of data, and determines similarity between the data based on the similar fingerprints. Similar data has a same similar fingerprint.

When one piece of data in the n+1 pieces of data needs to be read, only the data 1 and the differential data of the piece of data that are in the preset storage space need to be read, and next, the data 1 and the differential data of the piece of data are combined to obtain the piece of data.

For example, it is assumed that the preset storage space shown in FIG. 6 is a second preset storage space in the foregoing storage device. The storage system reads the data 2, and the storage system uses one read I/O to read data in a storage unit 1 and a storage unit 2 that are in the second preset storage space.

Figure 7:
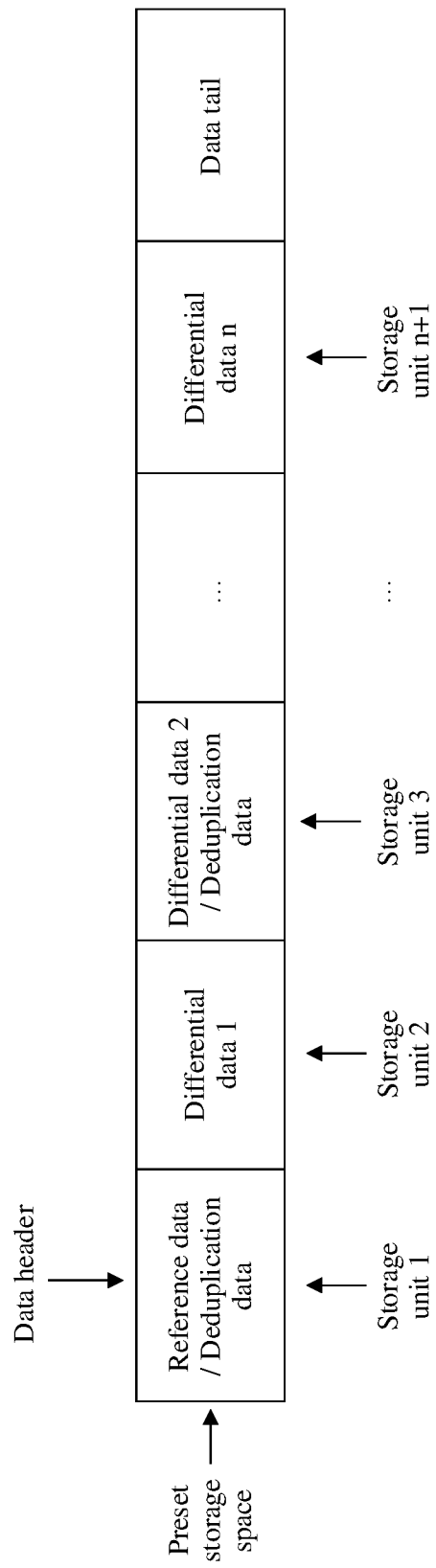

FIG. 7 is a schematic diagram of a partial data storage structure in which similar data and deduplication data are mixed and stored according to a solution. Similarly, the data storage structure includes a plurality of storage units in one preset storage space, and the plurality of storage units include a storage unit of a data header and a storage unit of a data tail. The storage unit of the data header may be for storing reference data, and the reference data may also be deduplication data. Another storage unit other than the data tail may be for storing differential data and/or deduplication data, where some differential data may also be deduplication data. Optionally, one storage unit may be configured to store one piece of differential data and/or deduplication data; or if a capacity of one piece of differential data and/or deduplication data is large, a plurality of storage units may be applied for storage.

For ease of understanding application of a data structure shown in FIG. 7, the following uses an example for description. It is assumed that there are n+2 pieces of data, the n+2 pieces of data are respectively referred to as data 1, data 2, . . . , data k, data k', data k+1, data k+2, . . . , data n, and data n+1, and the n+2 pieces of data are similar data, where the data k and the data k' are same data. In this case, to save storage space, only one of the data k and the data k' may be stored, and the two pieces of data do not need to be both stored. Similarly, the n+2 pieces of data each include the data 1. In this case, the data 1 may be used as the reference data. In the n+2 pieces of data, pieces of data that are in the data 2, the data 3, . . . , the data k, the data k+1, the data k+2, . . . , and the data n+1 except the data and that are respectively different from the data 1 may be respectively referred to as differential data 1, differential data 2, . . . , differential data k−1, differential data k, . . . , and differential data n, where k is an integer greater than 1. The n+2 pieces of data have a same similar fingerprint. When performing deduplication, the storage system further needs to calculate deduplication fingerprints of the data. If the deduplication fingerprints of the data are the same, content of the data is considered to be the same. Deduplication fingerprints of the n+2 pieces of similar data are referred to as deduplication fingerprints associated with the similar fingerprints of the n+2 pieces of data.

During storage, similarly, the data 1 is stored, as the reference data, in the storage unit of the data header of the preset storage space, and then the differential data 1, the differential data 2, . . . , and the differential data n are respectively stored in other storage units of the preset storage space. In this case, data consisting of the data 1 and the differential data k−1 is both the data k and the data k', but only one piece is stored. Therefore, the data 1 and the differential data k−1 are deduplication data.

For example, in FIG. 7, data consisting of data stored in a storage unit 1 and a storage unit 3 is deduplication data. Therefore, the data stored in the storage unit 1 is deduplication data, and the data stored in the storage unit 3 is also deduplication data.

For the data storage structure shown in FIG. 7, a data reading operation is similar to the corresponding data reading operation in the foregoing descriptions in FIG. 5 and FIG. 6. Details are not described herein again.

Figure 8:
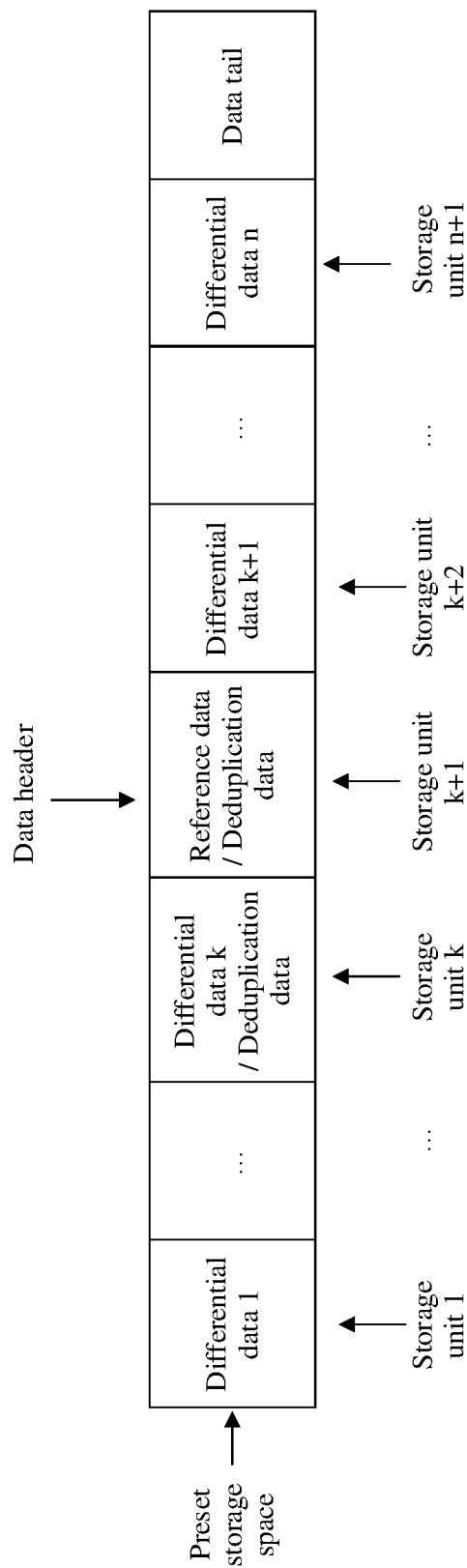

FIG. 8 is another schematic diagram of a partial data storage structure in which similar data and deduplication data are mixed and stored according to a solution. The structure shown in FIG. 8 is a variation of the structure shown in FIG. 7. In the data storage structure shown in FIG. 8, reference data is no longer stored in a storage unit on an edge of the preset storage space but is stored in any storage unit other than storage units on two edges of the preset storage space. In other words, the reference data is stored between differential data.

Optionally, the reference data is stored in a storage unit of a data header in the preset storage space. In this case, the storage unit of the data header is any one or more consecutive storage units in the preset storage space other than the storage units on the two edges.

In this way, data reading time of the storage system may be reduced. For ease of understanding, an example is used for description, and reference is still made to FIG. 7 and FIG. 8. It is assumed that the foregoing data n+1 is stored in each of the data storage structures shown in FIG. 7 and FIG. 8. In this case, when the data n+1 is stored in the data storage structure in FIG. 7, if the storage system needs to read the data n+1, the storage system needs to read all data between the storage unit 1 and the storage unit n+1. Next, the reference data in the storage unit 1 and the differential data n in the storage unit n+1 are extracted to form the data n+1, and other data is discarded.

When the data n+1 is stored in the data storage structure in FIG. 8, if the storage system needs to read the data n+1, the storage system needs to read all data between the storage unit k+1 and the storage unit n+1. Next, the reference data in the storage unit k+1 and the differential data n in the storage unit n+1 are extracted to form the data n+1, and other data is discarded.

In contrast, in the data storage structure shown in FIG. 8, when needed data is read, less useless data needs to be read, and even no useless data needs to be read. Therefore, data reading time of the storage system may be reduced in the data storage structure shown in FIG. 8.

Figure 9:
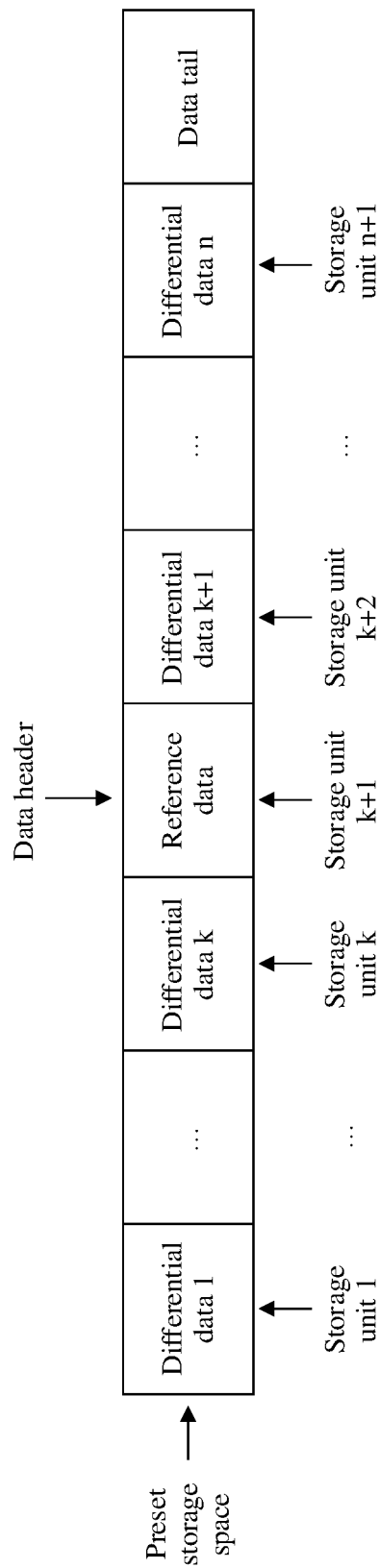
FIG. 9 is a schematic diagram of another data storage structure according to an embodiment.

In addition, the data storage structure shown in FIG. 6 may also be transformed into a data storage structure similar to that in FIG. 8. Refer to FIG. 9. In other words, the reference data is no longer stored in a storage unit on an edge of the preset storage space but is stored in any one or more consecutive storage units other than storage units on the two edges of the preset storage space. In other words, the reference data is stored between differential data. In this way, data reading time of the storage system may also be reduced. For a manner of reducing the data reading time of the storage system, refer to the corresponding description in FIG. 8. Details are not described herein again.

In some possible structures, the reference data stored in the data storage structures shown in FIG. 6, FIG. 7, FIG. 8, and FIG. 9 may be stored in a corresponding storage unit after being compressed or may be stored in a corresponding storage unit without being compressed. Reference data is stored after being compressed, so that storage space may be saved and storage space utilization may be improved. However, in an embodiment, whether to compress reference data is determined based on a situation. This is not limited in this solution.

In some possible implementations, the data stored in the data storage structures shown in FIG. 5, FIG. 6, FIG. 7, FIG. 8, and FIG. 9 may be stored after being completely compressed, or may be stored after being partially compressed, or may be stored without being compressed. In an embodiment, whether to compress data is determined based on a situation. This is not limited in this solution.

Figure 10:
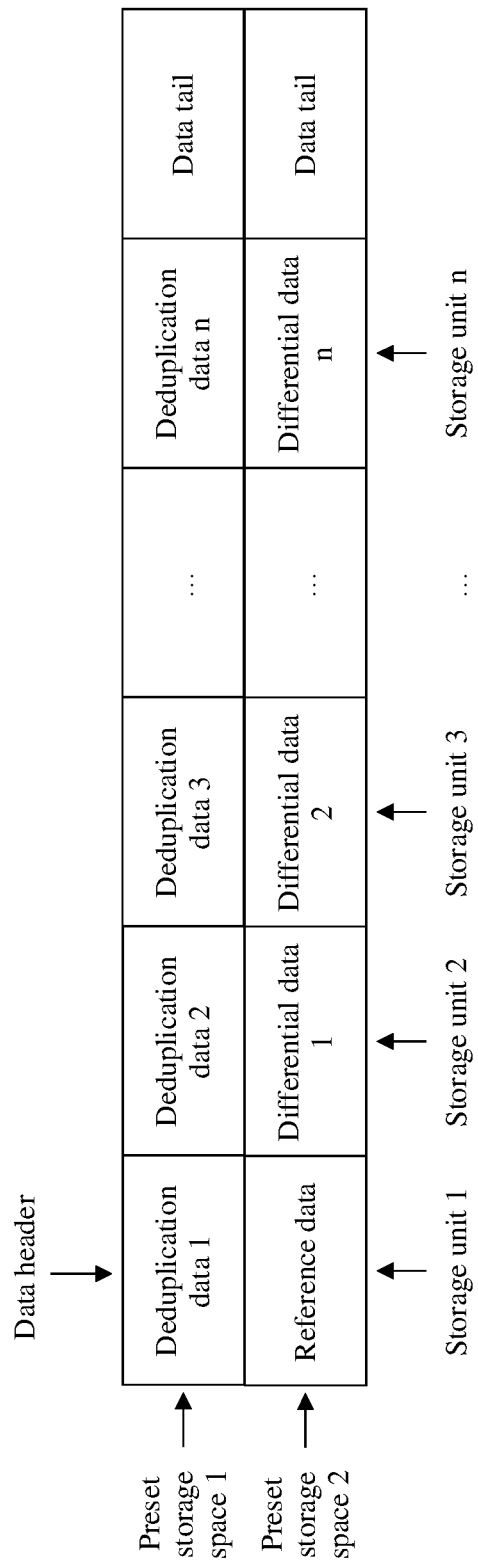
FIG. 10 is a schematic diagram of another data storage structure according to an embodiment.

In some possible implementations, the data storage structure provided in the embodiments may include a plurality of types among the five data storage structures shown in FIG. 5, FIG. 6, FIG. 7, FIG. 8, and FIG. 9. In other words, a plurality of types of the five data storage structures shown in FIG. 5, FIG. 6, FIG. 7, FIG. 8, and FIG. 9 may be included in the foregoing storage device. For example, as shown in FIG. 10, the storage structure shown in FIG. 10 includes two preset storage spaces. A data storage structure in a preset storage space 1 is the data storage structure shown in FIG. 5, and a data storage structure in a preset storage space 2 is the data storage structure shown in FIG. 6. It may be appreciated that FIG. 10 is merely an example to show that the data storage structure provided in the embodiments may include a plurality of types of structures among the five storage structures shown in FIG. 5, FIG. 6, FIG. 7, FIG. 8, and FIG. 9. Data storage structures included are determined based on an actual situation. This is not limited in this solution.

It should be noted that the data storage structure provided in the embodiments may store similar data and deduplication data and may further store independent data. The independent data is neither similar to nor the same as stored data.

Figure 11:
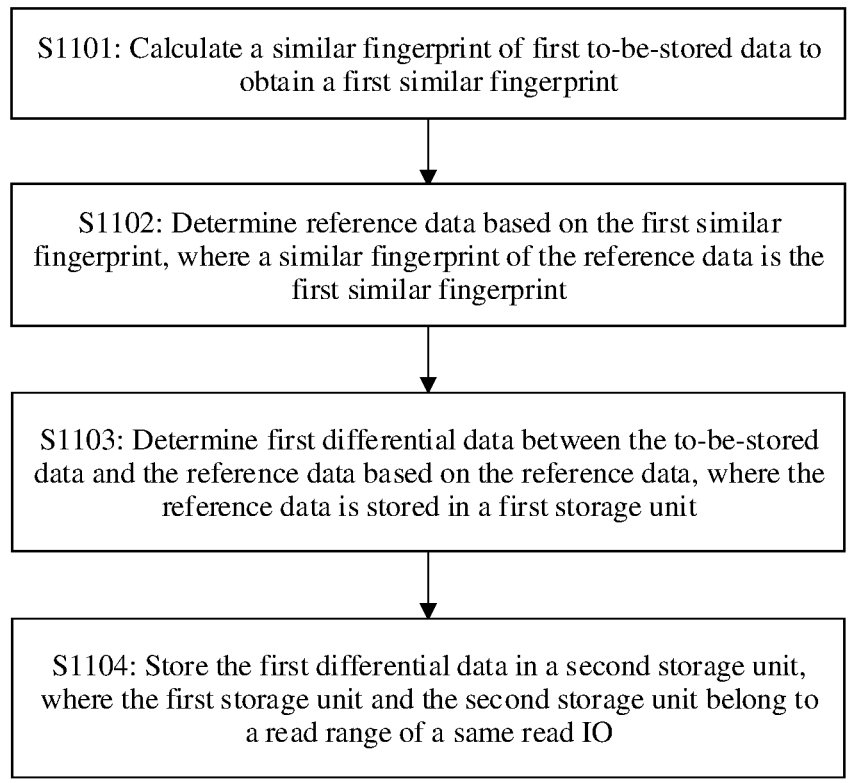
FIG. 11 is a schematic flowchart of a data storage method in a storage system according to an embodiment.

Based on the foregoing descriptions for the data storage structures, the following describes a data storage method in a storage system. The data storage method in the storage system may be applied to the data storage structures described above to store data. FIG. 11 shows a data storage method in a storage system according to an embodiment. The method includes but is not limited to the following steps:

Step 1101: Calculate a similar fingerprint of first to-be-stored data to obtain a first similar fingerprint.

In an embodiment, when a piece of data (the data may be referred to as the first to-be-stored data) needs to be stored, the storage system may first calculate the similar fingerprint of the first to-be-stored data. For example, a similar fingerprint of to-be-stored data may be calculated by using an algorithm such as a min hash algorithm. The similar fingerprint of the first to-be-stored data may be referred to as the first similar fingerprint. The similar fingerprint of the first to-be-stored data may be for determining whether the first to-be-stored data is similar to stored data.

Step 1102: Determine reference data based on the first similar fingerprint, where a similar fingerprint of the reference data is the first similar fingerprint.

The reference data is data in the stored data, and the reference data is stored in a first storage unit of a preset storage space. The first storage unit may be one or more of a plurality of storage units that are included in the preset storage space, and data stored in the preset storage space can be read by one read I/O.

Optionally, if the first storage unit includes a plurality of storage units, the plurality of storage units included in the first storage unit are a plurality of consecutive storage units.

Optionally, the first similar fingerprint may be compared with similar fingerprints of the stored data, to determine whether the first to-be-stored data is similar to the stored data.

In an embodiment, if the first similar fingerprint is included in the similar fingerprints of the stored data, it indicates that the first to-be-stored data is similar to one or more pieces of data represented by the first similar fingerprint. In this case, one of the one or more pieces of data represented by the first similar fingerprint may be selected as reference data of the first to-be-stored data.

Step 1103: Determine first differential data between the to-be-stored data and the reference data based on the reference data, where the reference data is stored in the first storage unit.

Step 1104: Store the first differential data in a second storage unit, where the first storage unit and the second storage unit belong to a read range of a same read I/O.

In an embodiment, after the reference data of the first to-be-stored data is determined based on the first similar fingerprint, the storage system may calculate differential data between the first to-be-stored data and the reference data to obtain the first differential data. Next, the first differential data obtained through calculation is stored in the second storage unit of the preset storage space that stores the reference data. The second storage unit may be one or more consecutive storage units in which no data is stored and that are in the preset storage space.

In this embodiment, the reference data and the differential data are stored in the same preset storage space, and data stored in the preset storage space can be read by one read I/O, avoiding a problem of read amplification and improving read performance of a storage system.

In a possible implementation, each similar fingerprint in similar fingerprints of the stored data is associated with one or more deduplication fingerprints. In this embodiment, data that has a same similar fingerprint is similar data, data that has a same deduplication fingerprint is same data, and similar fingerprints of the same data are the same. In this case, in the embodiment of the data storage method in the storage system shown in FIG. 11, data may alternatively be stored with reference to a deduplication fingerprint of the first to-be-stored data. In other words, an implementation of "step 1102: Determine reference data based on the first similar fingerprint" may further include the following implementation.

When the first similar fingerprint of the first to-be-stored data is calculated, the deduplication fingerprint of the first to-be-stored data may be further calculated to obtain a first deduplication fingerprint. For example, an algorithm such as sha1, md5, or a double hash algorithm may be for calculating the deduplication fingerprint of the first to-be-stored data. The deduplication fingerprint of the first to-be-stored data may be for determining whether the first to-be-stored data is the same as the stored data.

Next, the storage system may first compare the first similar fingerprint with the similar fingerprints of the stored data, to determine whether the first to-be-stored data is similar to the stored data.

When the first similar fingerprint is included in the similar fingerprints of the stored data, in other words, when the first to-be-stored data is similar to one or more pieces of data represented by the first similar fingerprint, the first deduplication fingerprint is compared with a deduplication fingerprint associated with the first similar fingerprint, to further determine whether the first to-be-stored data is the same as data represented by one or more deduplication fingerprints associated with the first similar fingerprint. If the first deduplication fingerprint is different from all deduplication fingerprints associated with the first similar fingerprint, it indicates that the first to-be-stored data is only similar to but not the same as one or more pieces of data represented by the one or more deduplication fingerprints associated with the first similar fingerprint. Therefore, a similar compression storage manner may be for storing the first to-be-stored data.

Next, similarly, one of the one or more pieces of data represented by the first similar fingerprint may be selected as the reference data of the first to-be-stored data. For a subsequent storage procedure, refer to the descriptions in step 1103 and step 1104. Details are not described herein again.

Optionally, the similar fingerprints of the stored data and the one or more deduplication fingerprints associated with each similar fingerprint in the similar fingerprints of the stored data may be stored in a converged fingerprint table. The converged fingerprint table is described in detail below, and details are not described herein. After the differential data between the first to-be-stored data and the reference data is determined, the deduplication fingerprint of the first to-be-stored data, namely the first deduplication fingerprint, may be added, as a deduplication fingerprint associated with the first similar fingerprint, to a storage space in which the similar fingerprints of the stored data are stored, for example, the converged fingerprint table. In addition, information such as a deduplication count of the deduplication fingerprint of the first to-be-stored data and a logical address of the first to-be-stored data may be added to the converged fingerprint table, so that the first to-be-stored data can be quickly found through indexing and read.

The following describes an example of the converged fingerprint table. The similar fingerprints of the stored data and the one or more deduplication fingerprints associated with each similar fingerprint in the similar fingerprints of the stored data may be stored in the converged fingerprint table. In this case, the similar fingerprints and the deduplication fingerprints of the stored data in the storage device are included in the converged fingerprint table. Each similar fingerprint in the converged fingerprint table corresponds to one or more deduplication fingerprints. In addition, related information of the deduplication count and related information of the logical address of the data may be further included in the converged fingerprint table. For ease of understanding the converged fingerprint table, refer to Table 1. Table 1 shows, for example, a schematic table structure of the converged fingerprint table.

TABLE 1

| Similar fingerprint | Deduplication fingerprint | Deduplication count | Logical address of data |
|---|---|---|---|
| SFP1 | FP1 | 1 | LAB1 |
|  | FP2 | 2 | LAB2 |
|  | FP3 | 2 | LAB3 |
|  | FP4 | 1 | LAB4 |
| SFP2 | FP5 | 2 | LAB5 |
|  | FP6 | 3 | LAB6 |

It can be understood from Table 1 that a similar fingerprint, a deduplication fingerprint, a deduplication count, and a logical address of data may be included in the converged fingerprint table. Same similar fingerprints indicate that a plurality of pieces of data corresponding to the similar fingerprint are similar data or same data. In the case of the similar data, both a same part and a different part exist between the plurality of pieces of data. Herein, it indicates that similar fingerprints of the same data are the same. Optionally, the similar fingerprints may be sorted in a lexicographical sorting manner.

The deduplication fingerprint indicates that data that has same deduplication fingerprints is completely duplicate data. The deduplication count indicates a quantity of reference times of data corresponding to a deduplication fingerprint. For example, it is assumed that j pieces of identical data need to be stored, but only one piece of the j pieces of data is actually stored, and the other j−1 pieces of data are not stored. In this case, the stored one piece of data represents the j pieces of data, and the deduplication count is j.

The logical address of the data is for indexing stored data. In other words, a storage location of corresponding data may be found through indexing based on the logical address. The storage location may be, for example, a storage unit that is in a preset storage space on a disk surface.

In Table 1, a similar fingerprint SFP1 corresponds to four deduplication fingerprints. This indicates that similar fingerprints of four pieces of data in the stored data are the same, that is, SFP1, but deduplication fingerprints of the four pieces of data are different, and the deduplication fingerprints are respectively FP1, FP2, FP3, and FP4. Deduplication counts of FP1, FP2, FP3, and FP4 are respectively 1, 2, 2, and 1. This indicates that data to which FP2 and FP3 point is deduplication data. In addition, similarly, a similar fingerprint SFP2 in Table 1 corresponds to two deduplication fingerprints. This indicates that similar fingerprints of two pieces of data in the stored data are the same, that is, SFP2, but deduplication fingerprints of the two pieces of data are different, and the deduplication fingerprints are respectively FP5 and FP6. Deduplication counts of FP5 and FP6 are respectively 2 and 3. This indicates that data to which FP5 and FP6 point is also deduplication data.

The converged fingerprint table shown in Table 1 is merely an example, and data included in the converged fingerprint table is determined based on a situation. In addition, in the converged fingerprint table, in addition to the four pieces of information: the similar fingerprint, the deduplication fingerprint, the deduplication count, and the logical address of data, other information may be further included. Information to be included is determined based on a situation, and this is not limited in this solution.

In a possible implementation, after step 1104, the data storage method in the storage system provided in this embodiment may further include: calculating a similar fingerprint of second to-be-stored data to obtain the first similar fingerprint; calculating a deduplication fingerprint of the second to-be-stored data to obtain the first deduplication fingerprint; comparing the first deduplication fingerprint of the second to-be-stored data with the deduplication fingerprints associated with the first similar fingerprint to determine that the deduplication fingerprints associated with the first similar fingerprint include the first deduplication fingerprint; and increasing the quantity of reference times of the first deduplication fingerprint by one.

In an embodiment, the storage system may first calculate the similar fingerprint and the deduplication fingerprint that are of the second to-be-stored data. It is assumed that the similar fingerprint and the deduplication fingerprint that are of the second to-be-stored data and that are obtained through calculation are respectively the first similar fingerprint and the first deduplication fingerprint. Next, the first similar fingerprint and the first deduplication fingerprint are respectively compared with the similar fingerprints and the deduplication fingerprints of the stored data, to finally determine that the deduplication fingerprint of the second to-be-stored data is the same as the deduplication fingerprint of the stored first to-be-stored data. This indicates that the second to-be-stored data and the first to-be-stored data are same data. To save storage space, the same data is stored only once. In this case, the storage system may not store the second to-be-stored data but may increase a deduplication count of the first deduplication fingerprint by 1 to indicate that data represented by the first deduplication fingerprint is referenced for another time.

Optionally, if the deduplication count of the first deduplication fingerprint is stored in the converged fingerprint table, the deduplication count that is of the first deduplication fingerprint and that is in the converged fingerprint table is increased by 1.

In this embodiment, data that has a same deduplication fingerprint is same data, that is, duplicate data. Therefore, to save storage space and improve storage space utilization, in a plurality of pieces of duplicate data, only one piece needs to be stored. In addition, a deduplication count may be for recording an original quantity of pieces of the duplicate data, so that a quantity of times that the data may be referenced is known.

In a possible implementation, the data storage method in the storage system provided in this embodiment may further include: If it is determined, based on a similar fingerprint of to-be-stored data and the similar fingerprints of the stored data, that the to-be-stored data is neither the same as nor similar to data in the stored data, the to-be-stored data is directly stored.

In an embodiment, if the similar fingerprint of the to-be-stored data is different from all the similar fingerprints of the stored data, it indicates that the to-be-stored data is new data and is neither the same as nor similar to the stored data. In this case, the storage system may apply for a new preset storage space to store the to-be-stored data. Alternatively, if a storage unit in a preset storage space in which data has been stored is not full, the storage system may store the to-be-stored data in the storage unit that is not full.

Next, information such as the similar fingerprint of the to-be-stored data, a deduplication fingerprint of the to-be-stored data, a deduplication count of the deduplication fingerprint of the to-be-stored data, and a logical address of the to-be-stored data may be added to the storage space in which the similar fingerprints of the stored data are stored, for example, the converged fingerprint table, so that the to-be-stored data can be quickly found through indexing and read.

In a possible implementation, the stored data in the preset storage space in which the reference data is stored may include a plurality of pieces of differential data, the plurality of pieces of differential data may be differential data between third data and the reference data, and the third data may include a plurality of pieces of data similar to the reference data. In this case, the preset storage space in which the reference data is stored may be, for example, the preset storage space shown in FIG. 6, FIG. 7, FIG. 8, or FIG. 9.

In a possible implementation, a deduplication count of the reference data is greater than 1, and a deduplication count of one or more pieces of data in the first differential data and the plurality of pieces of differential data is greater than 1. This indicates that the reference data is deduplication data, and the one or more pieces of data in the first differential data and the plurality of pieces of differential data are also deduplication data. If the reference data, the first differential data, and the plurality of pieces of differential data are stored in a same preset storage space, the preset storage space may be, for example, the preset storage space shown in FIG. 7 or FIG. 8.

In a possible implementation, the plurality of storage units included in the preset storage space in which the reference data is stored are consecutively arranged in order. In this case, the first storage unit that is in the preset storage space and that stores the reference data may be any one or more consecutive storage units in the plurality of storage units other than a storage unit at an initial location and a storage unit at an end location. The preset storage space may be, for example, the preset storage space shown in FIG. 8 or FIG. 9.

The following describes a process in which the storage system reads data after storing data according to the foregoing described data storage method in the storage system.

Figure 12:
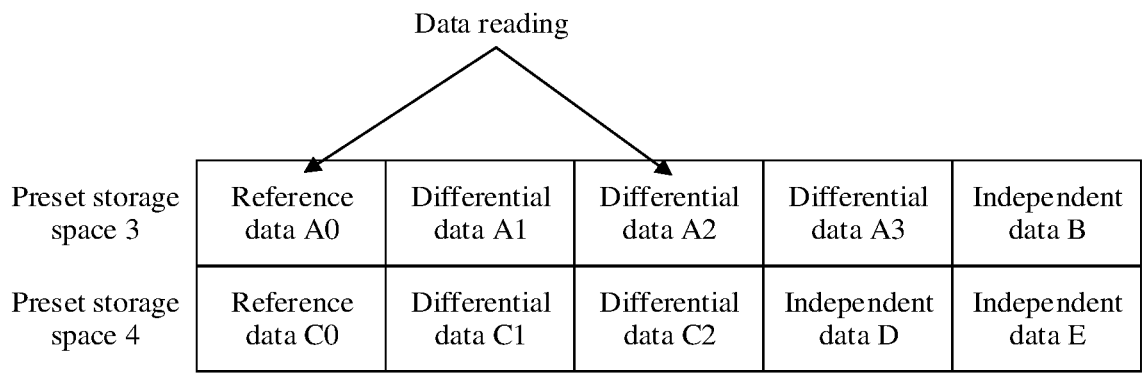
FIG. 12 is a schematic diagram of data reading according to an embodiment.

FIG. 12 is a schematic diagram of data reading according to an embodiment. FIG. 12 shows a schematic diagram of an example of a data storage structure of two preset storage spaces. In the structure, both reference data and differential data corresponding to the reference data are stored in a same preset storage structure (the differential data corresponding to the reference data is data that is included in data similar to the reference data and that is different from the reference data). In FIG. 12, reference data A0 and differential data A1 form data A1, reference data A0 and differential data A2 form data A2, and the like. When the storage system needs to read the data A2, the storage system may directly obtain the reference data A0 and the differential data A2 from a preset storage space 3 by performing one read I/O operation, and next, combine the obtained data to obtain the data A2.

Figure 13:
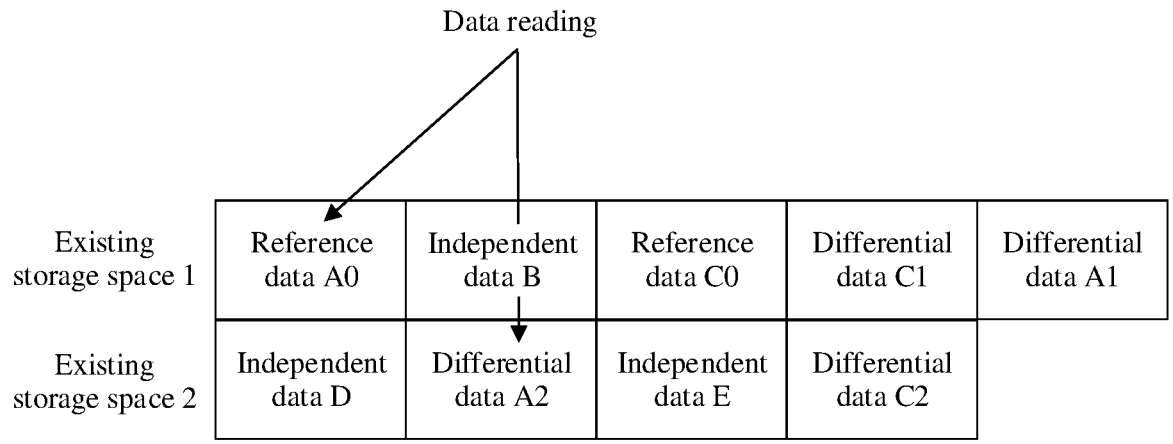
FIG. 13 is a schematic diagram of data reading according to the prior art.

FIG. 13 is a schematic diagram of data reading in the prior art. FIG. 13 shows a schematic diagram of an example of a data storage structure in the prior art. It can be seen that, in the data storage structure, reference data and differential data corresponding to the reference data are stored in a disorderly and irregular manner. Similarly, in FIG. 13, reference data A0 and differential data A1 form data A1, reference data A0 and differential data A2 form data A2, and the like. When the storage system needs to read the data A2, two read I/O operations need to be performed. In one read I/O operation, the reference data A0 is first read from an existing storage space 1, and in the other read I/O operation, differential data A2 is read from an existing storage space 2. Next, the data A2 is obtained by combining the data read by the two read I/O operations.

Compared with that in the prior art, the data storage structure provided in this embodiment can improve data reading efficiency and improve read performance of a storage system. Compared with an original storage solution, this embodiment improves read performance by 80%, reduces two read I/O operations to one read I/O operation, and reduces read time by half. In addition to time that is slightly increased by 20% due to an increase in a data reading amount, a result of improving read performance by 80% is achieved.

The foregoing describes the data storage structure, the data storage method in the storage system, and the data reading process that are provided in the embodiments. It may be understood that, to implement the foregoing corresponding functions, each device includes a corresponding hardware structure and/or software module for performing each function. A person skilled in the art should be aware that the units and algorithm steps in the examples described in the embodiments may be implemented by hardware or a combination of hardware and computer software. Whether a function is performed by hardware or hardware driven by computer software depends on a particular application and a constraint condition of the solutions. A person skilled in the art may use different methods to implement the described functions for each particular application, but it should not be considered that the implementation goes beyond the scope of the embodiments.

In the embodiments, the storage system and the like may be divided into function modules based on the foregoing method examples. For example, each function module may be obtained through division for each corresponding function, or two or more functions may be integrated into one module. The integrated module may be implemented in a form of hardware or may be implemented in a form of a software function module. It should be noted that, in the embodiments, module division is an example, and is merely logical function division. In an actual implementation, another division manner may be used.

Figure 14:
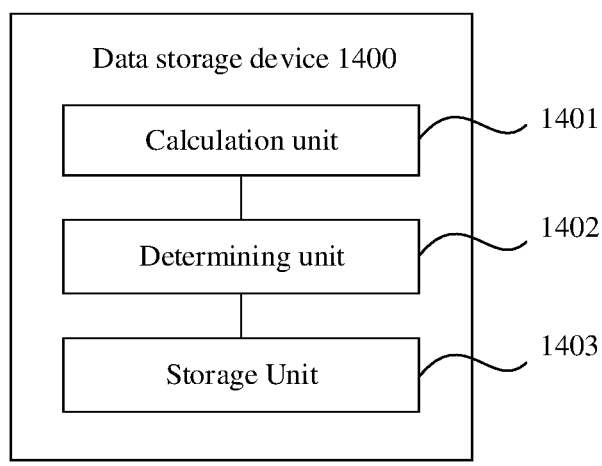
FIG. 14 is a schematic diagram of a logical structure of a data storage device according to an embodiment.

When each function module is obtained through division for each corresponding function, FIG. 14 is a schematic diagram of a logical structure of a data storage device according to an embodiment. The data storage device may be a controller of the storage array in the foregoing method embodiment or a storage node in the distributed storage system. The data storage device 1400 includes:

a calculation unit 1401, configured to calculate a similar fingerprint of first to-be-stored data to obtain a first similar fingerprint, where the first similar fingerprint is for determining whether the first to-be-stored data is similar to stored data;

a determining unit 1402, configured to determine reference data based on the first similar fingerprint, where a similar fingerprint of the reference data is the first similar fingerprint, and the determining unit 1402 is further configured to determine first differential data between the to-be-stored data and the reference data based on the reference data, where the reference data is stored in a first storage unit; and a storage unit 1403, configured to store the first differential data in a second storage unit, where the first storage unit and the second storage unit belong to a read range of a same read I/O.

In a possible implementation, the calculation unit 1401 is further configured to calculate a deduplication fingerprint of the first to-be-stored data to obtain a first deduplication fingerprint.

The device further includes a comparison unit, and the comparison unit is configured to compare the first deduplication fingerprint with a deduplication fingerprint associated with the first similar fingerprint, to determine that the first deduplication fingerprint is different from the associated deduplication fingerprint, where a similar fingerprint of data represented by the associated deduplication fingerprint is the first similar fingerprint.

In a possible implementation, the device further includes an adding unit, and the adding unit is configured to add the first deduplication fingerprint as a deduplication fingerprint associated with the first similar fingerprint.

In a possible implementation, the calculation unit 1401 is further configured to calculate a similar fingerprint of second to-be-stored data to obtain the first similar fingerprint, and configured to calculate a deduplication fingerprint of the second to-be-stored data to obtain the first deduplication fingerprint.

The comparison unit is further configured to compare the first deduplication fingerprint of the second to-be-stored data with the deduplication fingerprints associated with the first similar fingerprint, to determine that the deduplication fingerprints associated with the first similar fingerprint include the first deduplication fingerprint.

The device further includes an increasing unit, and the increasing unit is configured to increase a quantity of reference times of the first deduplication fingerprint by one.

In a possible implementation, a third storage unit of the storage system stores second differential data. The second differential data is differential data between second data and the reference data; a similar fingerprint of the second data is the first similar fingerprint; and the first storage unit, the second storage unit, and the third storage unit belong to a read range of a same read I/O.

In a possible implementation, a quantity of reference times of a deduplication fingerprint of the reference data is greater than 1, and the deduplication fingerprints associated with the first similar fingerprint include the deduplication fingerprint of the reference data.

In a possible implementation, the first storage unit and the second storage unit belong to storage space preset by the storage system, a plurality of storage units in the preset storage space are successively arranged, and the first storage unit is a storage unit in the preset storage space other than a storage unit at an initial location and a storage unit at an end location.

In a possible implementation, the reference data is data stored in the first storage unit after being compressed.

In a possible implementation, deduplication counts of all pieces of data stored in the preset storage space are greater than 1.

For beneficial effects of the foregoing embodiments, refer to corresponding descriptions in the foregoing embodiments. Details are not described herein again.

An embodiment further provides a computer-readable storage medium. The computer-readable storage medium stores a computer program, and the computer program is executed by a processor to implement the operation performed by the storage system in the method in FIG. 11 and the possible implementations.

An embodiment further provides a computer program product. When a computer program in the computer program product is read and executed by a computer, the method in FIG. 11 and the possible implementations is performed.

In conclusion, in the embodiments, a similar relationship, a same relationship, or a different relationship between to-be-stored data and stored data is quickly determined with reference to a similar fingerprint and a deduplication fingerprint that are of the data, to implement efficient data storage. In addition, in the embodiments, reference data and differential data are stored in a same preset storage space, and data stored in the preset storage space can be read by one read I/O, avoiding a problem of read amplification and improving read performance of a storage system.

Finally, it should be noted that the foregoing embodiments are merely intended for describing the solutions, and are not limiting t. Although described in detail with reference to the foregoing embodiments, a person of ordinary skill in the art may still make modifications to the solutions, or make equivalent replacements without departing from the scope of the embodiments.

What is claimed is:
1. A data storage method comprising:
calculating a similar fingerprint of first to-be-stored data to obtain a first similar fingerprint, wherein the first similar fingerprint is for determining whether the first to-be-stored data is similar to stored data;

determining reference data based on the first similar fingerprint, wherein a similar fingerprint of the reference data is the first similar fingerprint;

determining first differential data between the first to-be-stored data and the reference data based on the reference data, wherein the reference data is stored in a first storage unit; and storing the first differential data in a second storage unit, wherein the first storage unit and the second storage unit belong to a read range of a same read input/output (I/O).

2. The data storage method according to claim 1, further comprising:

calculating a deduplication fingerprint of the first to-be-stored data to obtain a first deduplication fingerprint; and comparing the first deduplication fingerprint with a deduplication fingerprint associated with the first similar fingerprint, to determine that the first deduplication fingerprint is different from the associated deduplication fingerprint, wherein a similar fingerprint of data represented by the associated deduplication fingerprint is the first similar fingerprint.

3. The data storage method according to claim 2, further comprising:

adding the first deduplication fingerprint as a deduplication fingerprint associated with the first similar fingerprint.

4. The data storage method according to claim 3, further comprising:

calculating a similar fingerprint of second to-be-stored data to obtain the first similar fingerprint;

calculating a deduplication fingerprint of the second to-be-stored data to obtain the first deduplication fingerprint;

comparing the first deduplication fingerprint of the second to-be-stored data with the deduplication fingerprints associated with the first similar fingerprint, to determine that the deduplication fingerprints associated with the first similar fingerprint comprise the first deduplication fingerprint; and increasing a quantity of reference times of the first deduplication fingerprint by one.

5. The data storage method according to claim 2, wherein a third storage unit of a storage system stores second differential data; the second differential data is differential data between second data and the reference data; a similar fingerprint of the second data is the first similar fingerprint; and the first storage unit, the second storage unit, and the third storage unit belong to a read range of a same read I/O.

6. The data storage method according to claim 5, wherein a quantity of reference times of a deduplication fingerprint of the reference data is greater than 1, and the deduplication fingerprints associated with the first similar fingerprint comprise the deduplication fingerprint of the reference data.

7. The data storage method according to claim 1, wherein the first storage unit and the second storage unit belong to storage space preset by a storage system, a plurality of storage units in the preset storage space are successively arranged, and the first storage unit is a storage unit in the preset storage space other than a storage unit at an initial location and a storage unit at an end location.

8. A data storage system comprising:
an interface; and
a processor coupled to the interface and configured to:
calculate a similar fingerprint of first to-be-stored data to obtain a first similar fingerprint, wherein the first similar fingerprint is for determining whether the first to-be-stored data is similar to stored data;

determine reference data based on the first similar fingerprint, wherein a similar fingerprint of the reference data is the first similar fingerprint;

determine first differential data between the first to-be-stored data and the reference data based on the reference data, wherein the reference data is stored in a first storage unit; and store the first differential data in a second storage unit, wherein the first storage unit and the second storage unit belong to a read range of a same read I/O.

9. The data storage system according to claim 8, wherein the processor is further configured to:

calculate a deduplication fingerprint of the first to-be-stored data to obtain a first deduplication fingerprint; and compare the first deduplication fingerprint with a deduplication fingerprint associated with the first similar fingerprint, to determine that the first deduplication fingerprint is different from the associated deduplication fingerprint, wherein a similar fingerprint of data represented by the associated deduplication fingerprint is the first similar fingerprint.

10. The data storage system according to claim 9, wherein the processor is further configured to add the first deduplication fingerprint as a deduplication fingerprint associated with the first similar fingerprint.

11. The data storage system according to claim 10, wherein the processor is further configured to:

calculate a similar fingerprint of second to-be-stored data to obtain the first similar fingerprint;

calculate a deduplication fingerprint of the second to-be-stored data to obtain the first deduplication fingerprint;

compare the first deduplication fingerprint of the second to-be-stored data with the deduplication fingerprints associated with the first similar fingerprint, to determine that the deduplication fingerprints associated with the first similar fingerprint comprise the first deduplication fingerprint; and increase a quantity of reference times of the first deduplication fingerprint by one.

12. The data storage system according to claim 9, wherein a third storage unit of the system stores second differential data; the second differential data is differential data between second data and the reference data; a similar fingerprint of the second data is the first similar fingerprint; and the first storage unit, the second storage unit, and the third storage unit belong to a read range of a same read I/O.

13. The data storage system according to claim 12, wherein a quantity of reference times of a deduplication fingerprint of the reference data is greater than 1, and the deduplication fingerprints associated with the first similar fingerprint comprise the deduplication fingerprint of the reference data.

14. The data storage system according to claim 8, wherein the first storage unit and the second storage unit belong to storage space preset by the system, a plurality of storage units in the preset storage space are successively arranged, and the first storage unit is a storage unit in the preset storage space other than a storage unit at an initial location and a storage unit at an end location.

* * * * *